Mar. 20, 1923.
J. PERLIN
1,448,977
AUTOMATIC BRAKE FOR MOTOR VEHICLES
Filed Dec. 6, 1920
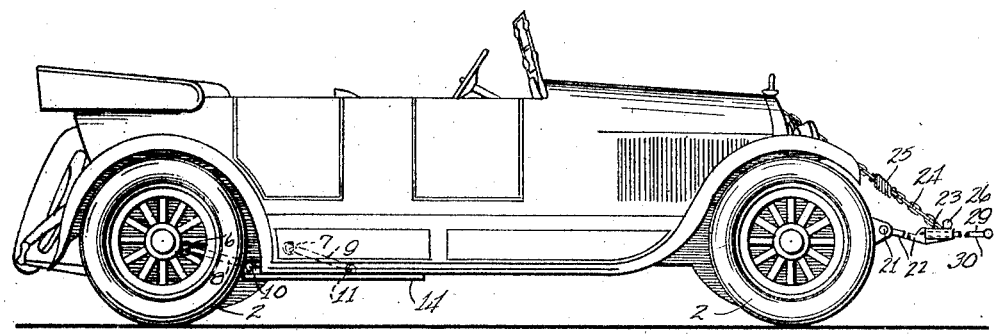
INVENTOR
J. Perlin
ATTORNEYS Patented Mar. 20, 1923.

1,448,977

UNITED STATES PATENT OFFICE.

JACOB PERLIN, OF CHICAGO, ILLINOIS.

AUTOMATIC BRAKE FOR MOTOR VEHICLES.

Application filed December 6, 1920. Serial No. 428,741.

*To all whom it may concern:*

Be it known that I, JACOB PERLIN, a citizen of Russia, and a resident of the city of Chicago, in the county of Cook and State of Illinois, have invented a new and useful Improvement in Automatic Brakes for Motor Vehicles, of which the following is a full, clear, and exact description.

My invention relates to improvements in brakes for motor vehicles and more particularly to an automatic safety brake for automobiles, trucks and the like, and it consists in the combinations, constructions and arrangements herein described and claimed.

An object of my invention is to provide an automobile braking device which will automatically bring the car to a stop when it strikes an obstacle.

A further object of my invention is to provide a device of the type described which has a novel and automatic means for placing anti-skid members underneath the rear wheels of an automobile when it has struck an obstacle.

A further object of my invention is to provide a device of the type described which has a novel bumper mechanism that automatically operates the braking mechanism of the device.

A further object of my invention is to provide a device of the type described which is simple in construction and operation, is strong, light and durable, has few moving parts, and is therefore not likely to easily get out of order.

A further object of my invention is to provide a device of the type described which can be easily attached to any car without altering the construction of the latter.

Other objects and advantages will appear in the following specification, and the novel features of the device, will be particularly pointed out in the appended claims.

My invention is illustrated in the accompanying drawing, forming a part of this application, in which—

Figure 1 is a side elevation of an automobile, showing the device attached,

Figure 2 is a side elevation of the device as shown attached to the frame of an automobile, Figure 3 is a top plan view of the device as shown attached to the frame of an automobile, Figure 4 is a perspective view of a portion of the device and Figure 5 is an enlarged view partly in section of a part of a mechanism illustrated in Figure 2.

In carrying out my invention, I make use of the ordinary automobile comprising a frame 1 which is mounted on wheels 2.

Secured to the side channel irons 3 and 4 of the frame 1 are a plurality of depending supports 5 which are adapted to rotatably carry two rods 6 and 7. Each of the rods 6 and 7 has secured thereto a pair of arms 8—8 and 9—9 respectively which carry rods 10 and 11 (see Figure 3). It will be noticed in Figure 3 that the rod 11 is longer than the rod 10 and has its ends 12 slidably disposed in guide members 13 which are secured to plates 14. The rod 10 is also slidably disposed in guide members 15 which are secured to the inner sides of the plates 14. When the arms 8—8 and 9—9 are in alinement with the supports 5, the plates 14 are adapted to rest on the ground (see Figure 2). This movement of the arms relative to the plates 14, allows the rear wheels 2 of the car to run up on the plates 14. Springs 18' are disposed on each of the rods 6 and 7 and are adapted to engage the arms 8—8 and 9—9 so as to bring them into alinement with the supports 5.

In order to keep the plates 14 up under the running boards of the car, as shown in Figures 1 and 2, I secure one end of a cable 18, to the rod 11, while its other end is secured to a pulley 19 which is mounted on a stub shaft 20 journaled in the channel iron 4. The end of the shaft 20 is squared and is adapted to receive a crank (not shown) with which it is rotated.

In place of the ordinary automobile bumper I make use of a rod 21 which is rotatably mounted in the frame 1 (see Figure 3). Two arms 22 are secured to the rod 21 and pivotally carry at their free ends, sleeves 23. It will be observed that chains 24 are fastened to the sleeves 23 and to the radiator of the car, having springs 25 disposed intermediate their lengths so as to afford a resilient or yieldable carrying means for the sleeves. A rod 26 is fastened to the sleeves 23 and takes the place of the ordinary car bumper.

The cable 18 carries a hook 27 (see Figure 3) that is adapted to engage a hook 28, which is carried by the rod 21. When the plates 14 are raised up underneath the running boards the hook 28 can engage the hook 27, thus holding the plates 14 up in position. If the car should strike an obstacle of any kind, the rod 26 would be pushed down into the dotted line position shown in Figure 2, causing the arms 22 to rotate the rod 21, thus releasing the hook 28 from the hook 27 which allows the plates 14 to drop beneath the rear wheels of the car. The bottoms of the plates 14 are ribbed so as to further facilitate the stopping of the car (see Figure 4).

I also provide an extension bumper 29 which has its rods 30 slidably disposed in the sleeves 23. It will be observed that when the bumper 29 is in the position as illustrated in the full lines of Figure 1, the ends of the rods 30 which are slidably disposed in the sleeves 23, engage the ends of the arms 22. If the bumper 29 strikes an obstacle, the rods 30 will swing the arms 22 to the dotted line position of Figure 5 which releases the retaining hook 28. The rods 30 will thereupon be freed from the ends of the arms 22 and will slide in the sleeves 23 (see dotted line position in Figure 2).

From the foregoing description of the various parts of the device, the operation thereof, may be readily understood. When the rod 26, which acts as the car's bumper, strikes an obstacle, it forces the arms 22 down into the dotted position shown in Figure 2, rotates the rod 21, releases the hook 28 from the hook 27 which allows the springs 18' to actuate the arms 8—8 and 9—9 and thus to carry the plates 14 from beneath the running boards to the ground. The momentum of the car carries the rear wheels 2 of the car on to the plates 14 while the rods 10 and 11, which are carried by the arms 8—8 and 9—9 respectively, slide in the guide members 13 and 15. Before the rods 10 and 11 reach the end of the guide members 13 and 15, the chains 16 become taut and prevent any further movement of the plates 14 relative the car. It is obvious that the wheels will revolve on the smooth plate 14 until the clutch of the car is released. The ribbed bottoms of the plates 14 dig into the ground and soon bring the car to a stop.

In order to bring the plates 14 back to their normal position, which is underneath the running boards, the car has to be backed up until the rear wheels free the plates 14 so that the plates can be raised by the winding of the cable 18 around the pulley 19, until the hook 27 can be engaged by the hook 28. It will be noticed that the guide members 13 and 15 have notches at one of their ends which are adapted to receive the rods 10 and 11 respectively. This prevents any movement of the plates 14 relative the rods 10 and 11 when the plates are off of the ground since the weight of the plates keep them in the notches. As soon as the plates strike the ground, however, the rods 10 and 11 are released from their respective notches and are thus permitted to slide along the guide members 13 and 15.

As will be seen in Figure 3, I provide a strap 31 which is wound zig-zag between the two arms 22 so as to carry the one who has been struck.

I claim:

1. The combination with a motor vehicle having drive wheels, of plates arranged to be interposed between said drive wheels and the ground, said plates having transverse ridges on the bottoms thereof, and upwardly extending slide members on the upper surfaces, said slide members being provided with longitudinal slots adapted to permit a supporting arm to operate and engage therewith.

2. As an article of manufacture a brake plate, said plate having a plurality of spaced apart transverse ridges on the bottom thereof and integral upwardly extending slide members on the upper surface thereof, said slide members having slots therethrough adapted to pivotally and slidably receive a supporting member whereby said plates may be pivotally and slidably supported on the supporting arm.

JACOB PERLIN.